United States Patent
Li et al.

(10) Patent No.: US 11,880,397 B2
(45) Date of Patent: Jan. 23, 2024

(54) EVENT ARGUMENT EXTRACTION METHOD, EVENT ARGUMENT EXTRACTION APPARATUS AND ELECTRONIC DEVICE

(71) Applicant: Beijing Baidu Netcom Science and Technology Co., Ltd., Beijing (CN)

(72) Inventors: Fayuan Li, Beijing (CN); Yuguang Chen, Beijing (CN); Lu Pan, Beijing (CN); Yuanzhen Liu, Beijing (CN); Cuiyun Han, Beijing (CN); Xi Shi, Beijing (CN); Jiayan Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 656 days.

(21) Appl. No.: 17/036,833

(22) Filed: Sep. 29, 2020

(65) Prior Publication Data
US 2021/0295098 A1    Sep. 23, 2021

(30) Foreign Application Priority Data

Mar. 20, 2020   (CN) .......................... 202010202897.1

(51) Int. Cl.
*G06F 18/214*   (2023.01)
*G06F 16/33*    (2019.01)
(Continued)

(52) U.S. Cl.
CPC ........ *G06F 16/3344* (2019.01); *G06F 18/214* (2023.01); *G06F 18/2415* (2023.01); *G06V 20/20* (2022.01); *G06V 20/43* (2022.01)

(58) Field of Classification Search
CPC .. G06F 16/3344; G06F 16/367; G06F 40/247; G06F 40/284; G06F 18/214;
(Continued)

(56) References Cited

U.S. PATENT DOCUMENTS

| | | | |
|---|---|---|---|
| 11,288,508 B2* | 3/2022 | Vo | ............................ G06F 18/24 |
| 2011/0295612 A1* | 12/2011 | Donneau-Golencer | ...................... G06F 40/30 705/1.1 |

(Continued)

FOREIGN PATENT DOCUMENTS

| | | |
|---|---|---|
| CN | 103530281 A | 1/2014 |
| CN | 104598535 A | 5/2015 |

(Continued)

OTHER PUBLICATIONS

Chinese Office Action corresponding to Chinese Patent Application No. 2020102028971.1, dated Dec. 20, 2022 (11 pages).

(Continued)

*Primary Examiner* — Abdelali Serrou
(74) *Attorney, Agent, or Firm* — Maginot, Moore & Beck LLP

(57) ABSTRACT

An event argument extraction (EAE) method, an EAE apparatus and an electronic device, relates to the technical field of knowledge graphs. A specific implementation scheme includes acquiring a to-be-extracted event content; and performing argument extraction on the to-be-extracted event content based on a trained EAE model, to obtain a target argument of the to-be-extracted event content; where the trained EAE model is obtained by training a pre-trained model with event news annotation data and a weight of each argument annotated in the event news annotation data.

9 Claims, 2 Drawing Sheets

(51) Int. Cl.
  *G06V 20/20* (2022.01)
  *G06V 20/40* (2022.01)
  *G06F 18/2415* (2023.01)
(58) Field of Classification Search
  CPC ...... G06F 18/22; G06F 40/169; G06F 11/079;
    G06F 16/258; G06F 40/279; G06F
    40/295; G06F 40/56; G06F 11/0793;
    G06F 11/302; G06F 11/3055; G06F
    11/327; G06F 16/3329; G06F 16/36;
    G06F 16/48; G06F 16/55; G06F 16/583;
    G06F 16/95; G06F 16/9535; G06F
    16/955; G06F 17/16; G06F 18/00; G06F
    18/24; G06F 18/241; G06F 18/25; G06F
    40/186; G06F 11/0775; G06F 11/0778;
    G06F 16/3334; G06F 16/3346; G06F
    16/335; G06F 16/38; G06F 16/387; G06F
    16/65; G06F 16/9538; G06F 18/23213;
    G06F 18/2415; G06F 40/106; G06F
    40/166; G06F 40/205; G06F 40/211;
    G06F 40/216; G06F 40/258; G06F 40/40
  See application file for complete search history.

(56) References Cited

U.S. PATENT DOCUMENTS

| | | | | |
|---|---|---|---|---|
| 2017/0041413 | A1* | 2/2017 | Chandhok | G06F 40/30 |
| 2018/0349355 | A1* | 12/2018 | Shi | G06F 40/284 |
| 2019/0303404 | A1* | 10/2019 | Amer | G06F 40/205 |
| 2019/0304157 | A1* | 10/2019 | Amer | G06F 40/30 |
| 2020/0050677 | A1* | 2/2020 | Li | G06F 16/248 |

FOREIGN PATENT DOCUMENTS

| | | | |
|---|---|---|---|
| CN | 104834718 | A | 8/2015 |
| CN | 109978060 | A | 7/2016 |
| CN | 105956197 | A | 9/2016 |
| CN | 106445990 | A | 2/2017 |
| CN | 109635280 | A | 4/2019 |
| CN | 110032641 | A | 7/2019 |
| CN | 110134757 | A | 8/2019 |
| CN | 110597976 | A | 12/2019 |
| CN | 110619053 | A | 12/2019 |
| JP | 2014228993 | A | 12/2014 |
| JP | 2016024545 | A | 2/2016 |

OTHER PUBLICATIONS

Machine English Translation of Chinese Office Action corresponding to Chinese Patent Application No. 2020102028971, dated Dec. 20, 2022 (7 pages).
Machine Translation of CN110032641A. (39 Pages).
Machine Translation of CN110134757A. (13 Pages).
Machine Translation of CN110597976A. (33 Pages).
Machine Translation of CN110619053A. (25 Pages).
Machine Translation of CN104598535A. (18 Pages).
Machine Translation of CN105956197A. (19 Pages).
Machine Translation of CN109978060A. (54 Pages).
Machine Translation of CN106445990A. (19 Pages).
Japanese Office Action corresponding to Japanese Patent Application No. 2021-044663, dated May 26, 2022 (4 pages).
Machine English Translation of Japanese Office Action corresponding to Japanese Patent Application No. 2021-044663, dated May 26, 2022 (4 pages).
Machine Translation of JP2016024545A. (24 Pages).
Machine Translation of JP2014228993A. (17 Pages).
Libin Hou et al: "Event Argument Extraction Based on CRF", Jul. 6, 2012 (2012-007-06), Chinese Lexical Semantics, Springer Berlin Heidelberg, Berlin, Heidelberg, pp. 32-39, XP047024967.
Extended European Search Report corresponding to European Patent Application No. 20202326.3, dated Mar. 16, 2021 (8 pages).

* cited by examiner

EVENT ARGUMENT EXTRACTION METHOD, EVENT ARGUMENT EXTRACTION APPARATUS AND ELECTRONIC DEVICE

CROSS-REFERENCE TO RELATED APPLICATION

The present application claims priority under 35 U.S.C. § 119 to the Chinese patent application 202010202897.1 filed on Mar. 20, 2020, which is incorporated herein by reference in its entirety.

TECHNICAL FIELD

The present application relates to the technical field of knowledge graphs in computer technologies, in particular to an event argument extraction (EAE) method, an EAE apparatus and an electronic device.

BACKGROUND

Event argument extraction refers to the extraction of various constituent elements (e.g., time, location, participant, content related to the event adaptation) of an event from an event description. Each element is an argument, and each argument corresponds to an argument role. Ultimately, the extracted arguments are presented to users in form of structural knowledge.

The commonly used EAE model is based on the concept of categorization. However, since event arguments of different event types correspond to different roles, an argument extraction using the conventional simple categorization model has poor effectiveness.

SUMMARY

The present application provides an event argument extraction (EAE) method, an EAE apparatus and an electronic device, to solve the problem of the poor effectiveness of event argument extraction in the prior art.

In a first aspect, the present application provides in an embodiment an EAE method, including acquiring a to-be-extracted event content and performing argument extraction on the to-be-extracted event content based on a trained EAE model, to obtain a target argument of the to-be-extracted event content. The trained EAE model is obtained by training a pre-trained model with event news annotation data and a weight of each argument annotated in the event news annotation data.

In the EAE method according to the embodiment of the present application, the trained EAE model used in the argument extraction performed on the to-be-extracted event content is obtained by training the pre-trained model with event news annotation data and a weight of each argument annotated in the event news annotation data, that is, the weight of each argument annotated in the event news annotation data used in training is considered in the training process, which can improve the performance of trained EAE model, thereby improving effectiveness of argument extraction.

Optionally, the trained EAE model is obtained at least in following manner:

training the pre-trained model in accordance with the event news annotation data and a loss function, to obtain the trained EAE model, where the loss function is associated with a predicted probability value, predicted by the pre-trained model, of each argument annotated in the event news annotation data and the weight of each argument annotated in the event news annotation data.

The pre-trained model is trained with the event news annotation data and the loss function, and the loss function takes account of not only the predicted probability value, predicted by the pre-trained model, of each argument annotated in the event news annotation data, but also the weight of each argument. In this way, the performance of trained EAE model can be improved, thereby improving effectiveness of argument extraction.

Optionally, the loss function is a weighted sum of negative log-likelihoods of predicted probability values, predicted by the pre-trained model, of all arguments annotated in the event news annotation data.

That is, the loss function is obtained by calculating, according to the weight of each argument annotated in the event news annotation data, a weighted sum of negative log-likelihoods of predicted probability values, predicted by the pre-trained model, of all arguments annotated in the event news annotation data. By training with the loss function obtained through the weighted summation, the performance of trained EAE model is improved, thereby improving effectiveness of argument extraction.

Optionally, the performing argument extraction on the to-be-extracted event content based on the trained EAE model, to obtain the target argument of the to-be-extracted event content includes performing argument extraction on the to-be-extracted event content based on the trained EAE model, to obtain a predicted probability value of at least one argument in the to-be-extracted event content, and determining an argument with a maximum predicted probability value and an argument with a predicted probability value greater than a probability threshold in the at least one argument as the target argument. The probability threshold is equal to the maximum predicted probability value multiplied by a preset coefficient, and the preset coefficient is a positive number less than or equal to 1.

In this way, the target argument is determined from the at least one argument based on the maximum predicted probability value and the preset coefficient, thereby improving the accuracy of the target argument.

Optionally, the training the pre-trained model in accordance with the event news annotation data and the loss function, to obtain the trained EAE model includes performing a format transformation on the event news annotation data in accordance with a preset question answering (QA) format, to obtain news QA data; and training the pre-trained model in accordance with the news QA data and the loss function, to obtain the trained EAE model.

In this embodiment, the pre-trained model is trained in accordance with the news QA data and the loss function to obtain the trained EAE model. In this way, the performance of trained EAE model can be improved, thereby improving effectiveness of argument extraction.

Optionally, the performing argument extraction on the to-be-extracted event content based on a trained EAE model, to obtain a target argument of the to-be-extracted event content includes:

predicting an event type of the to-be-extracted event content using a trained event type categorization model;

predicting an event descriptive sentence of the to-be-extracted event content using a trained event sentence discriminator model;

constructing to-be-extracted QA data corresponding to the to-be-extracted event content based on the event type, the event descriptive sentence, an argument role corresponding to the event type, and a preset QA format, where a format of the to-be-extracted QA data matches the preset QA format, and the to-be-extracted QA data comprises the event descriptive sentence of the to-be-extracted event content, the event type of the to-be-extracted event content, and the argument role corresponding to the event type; and inputting the to-be-extracted QA data to the trained EAE model, and performing argument extraction using the trained EAE model, to obtain the target argument.

In this embodiment, the to-be-extracted QA data inputted to EAE model includes the event descriptive sentence of the to-be-extracted event content, the event type of the to-be-extracted event content, and the argument role corresponding to the event type; the event argument extraction is performed by inputting the to-be-extracted QA data, which matches in format with reading comprehension data, to the trained EAE model; and the EAE model is obtained by introducing event news samples and reading comprehension data into the training on the basis of the pre-trained model, thereby improving effectiveness of event argument extraction.

In a second aspect, the present application provides in an embodiment an EAE apparatus, including a first acquisition model and an extraction module. The first acquisition module is configured to acquire a to-be-extracted event content. The extraction module is configured to perform argument extraction on the to-be-extracted event content based on a trained EAE model, to obtain a target argument of the to-be-extracted event content. The trained EAE model is obtained by training a pre-trained model with event news annotation data and a weight of each argument annotated in the event news annotation data.

Optionally, the trained EAE model is obtained at least in following manner:

training the pre-trained model in accordance with the event news annotation data and a loss function, to obtain the trained EAE model, where the loss function is associated with a predicted probability value, predicted by the pre-trained model, of each argument annotated in the event news annotation data and the weight of each argument annotated in the event news annotation data.

Optionally, the loss function is a weighted sum of negative log-likelihoods of predicted probability values, predicted by the pre-trained model, of all arguments annotated in the event news annotation data.

Optionally, the extraction module includes a probability prediction module and an argument determination module. The probability prediction module is configured to perform argument extraction on the to-be-extracted event content based on the trained EAE model, to obtain a predicted probability value of at least one argument in the to-be-extracted event content. The argument determination module is configured to determine an argument with a maximum predicted probability value and an argument with a predicted probability value greater than a probability threshold in the at least one argument as the target argument. The probability threshold is equal to the maximum predicted probability value multiplied by a preset coefficient, and the preset coefficient is a positive number less than or equal to 1.

Optionally, the training the pre-trained model in accordance with the event news annotation data and the loss function, to obtain the trained EAE model includes performing a format transformation on the event news annotation data in accordance with a preset QA format, to obtain news QA data, and training the pre-trained model in accordance with the news QA data and the loss function, to obtain the trained EAE model.

Optionally, the extraction module includes first and second prediction modules, a constructing module, and an argument extraction module. The first prediction module is configured to predict an event type of the to-be-extracted event content using a trained event type categorization model. The second prediction module is configured to predict an event descriptive sentence of the to-be-extracted event content using a trained event sentence discriminator model. The constructing module is configured to construct to-be-extracted QA data corresponding to the to-be-extracted event content based on the event type, the event descriptive sentence, an argument role corresponding to the event type, and a preset QA format, where a format of the to-be-extracted QA data matches the preset QA format, and the to-be-extracted QA data comprises the event descriptive sentence of the to-be-extracted event content, the event type of the to-be-extracted event content, and the argument role corresponding to the event type. The argument extraction module, configured to input the to-be-extracted QA data to the trained EAE model, and perform argument extraction using the trained EAE model, to obtain the target argument.

In a third aspect, the present application further provides in an embodiment an electronic device, including at least one processor and a memory communicatively connected to the at least one processor. The memory stores therein instructions configured to be executed by the at least one processor, and the at least one processor is configured to execute the instructions to implement the method according to each embodiment of the present application.

In a fourth aspect, the present application further provides in an embodiment a non-transitory computer readable storage medium storing therein computer instructions, where the computer instructions are configured to cause a computer to implement the method according to each embodiment of the present application.

BRIEF DESCRIPTION OF THE DRAWINGS

The accompany drawings are provided to facilitate a better understanding of the technical solutions of the present application, and by no means, constitute a limitation on the present application.

DETAILED DESCRIPTION

The exemplary embodiments of the present application are described hereinafter with reference to accompany drawings. The details of embodiments of the present application provided in the description are provided to facilitate understanding and are only intended to be exemplary. Those of ordinary skill in the art will appreciate that changes or modifications may be made in the described embodiments without departing from the scope and spirit of the present application. Further, for clarity and conciseness, descriptions of known functions and structures are omitted.

Figure 1:
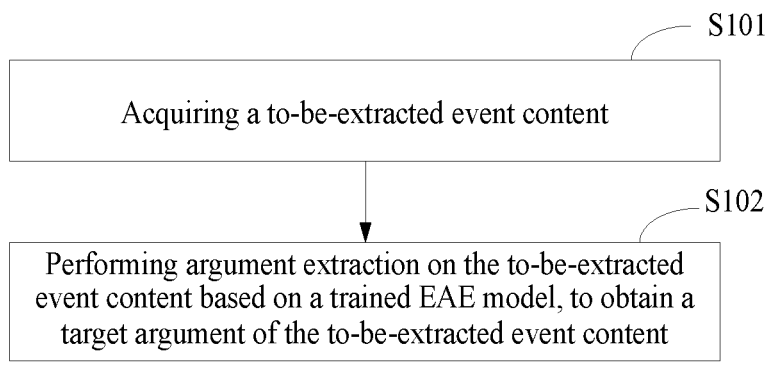
FIG. 1 is a schematic flow diagram of an EAE method according to an embodiment of the present application.

As shown in FIG. 1, according to an embodiment of the present application, an EAE method is provided. The method is applicable to an electronic device and includes the following steps.

Step S101 includes acquiring a to-be-extracted event content.

It is understood that the event content includes event news (e.g., news title, news context) and the like, and the to-be-extracted event content includes to-be-extracted event news. The argument extraction is subsequently performed on the to-be-extracted event content which may be acquired from events of practical application fields. For example, for financial field, the to-be-extracted event content of the financial field is acquired and then argument extraction is performed thereon. For another example, for Internet technology field, the to-be-extracted event news is acquired from the event news of Internet technology field, then argument extraction is performed on the to-be-extracted event news.

Step S102 includes performing argument extraction on the to-be-extracted event content based on a trained EAE model, to obtain a target argument of the to-be-extracted event content.

The trained EAE model is obtained by training a pre-trained model with event news annotation data and a weight of each argument annotated in the event news annotation data.

The trained EAE model is obtained in advance by training After the to-be-extracted event content is acquired, arguments in the to-be-extracted event content can be extracted using the trained EAE model to determine the target argument. In an example, the quantity of the target argument is at least one, that is, arguments in the to-be-extracted event content can be extracted using the trained EAE model, to determine at least one target argument.

In this embodiment, the trained EAE model is obtained by training based on event news annotation data and a weight of each argument annotated in the event news annotation data, where the event news annotation data may be understood as event argument annotation data, that is, not only event news is included, but also arguments in the event news are annotated so that argument annotation data is included. Event news samples may be understood as news context, etc., and may be event news samples of practical application fields. For example, event news samples may be real-time news in practical application fields. In an example, there are a variety of manners for calculating weights. For example, normalized weights may be calculated using a word importance calculation model.

In the EAE method according to the embodiment of the present application, the trained EAE model used in the argument extraction performed on the to-be-extracted event content is obtained by training the pre-trained model with event news annotation data and a weight of each argument annotated in the event news annotation data, that is, the weight of each argument annotated in the event news annotation data used in training is considered in the training process, which may improve the performance of trained EAE model, thereby improving effectiveness of argument extraction. Furthermore, by training a model with event news annotation data and a weight of each argument annotated in the event news annotation data, the embodiment may solve the problem that a single argument role corresponds to multiple arguments, so as to enhance the ability of extracting multiple arguments using the trained EAE model, thereby improving the effectiveness of extracting multiple arguments.

In an embodiment, the trained EAE model is obtained at least in following manner: training the pre-trained model in accordance with the event news annotation data and a loss function, to obtain the trained EAE model, where the loss function is associated with a predicted probability value, predicted by the pre-trained model, of each argument annotated in the event news annotation data and the weight of each argument annotated in the event news annotation data.

It is understood, the training process of a pre-trained model may involve a loss function. Different pre-trained models may correspond to different loss functions. In this embodiment, the trained EAE model is obtained by training the pre-trained model with the event news annotation data, a weight of each argument annotated in the event news annotation data, and a loss function.

The pre-trained model is trained with the event news annotation data and the loss function, and the loss function takes account of not only the predicted probability value, predicted by the pre-trained model, of each argument annotated in the event news annotation data, but also the weight of each argument. In this way, the performance of trained EAE model can be improved, thereby improving effectiveness of argument extraction.

In an embodiment, the loss function is a weighted sum of negative log-likelihoods of predicted probability values, predicted by the pre-trained model, of all arguments annotated in the event news annotation data.

That is, the loss function is obtained by calculating, according to the weight of each argument annotated in the event news annotation data, a weighted sum of negative log-likelihoods of predicted probability values, predicted by the pre-trained model, of all arguments annotated in the event news annotation data. By training with the loss function obtained through the weighted summation, the performance of trained EAE model is improved, thereby improving effectiveness of argument extraction.

In an embodiment, the performing argument extraction on the to-be-extracted event content based on the trained EAE model, to obtain the target argument of the to-be-extracted event content includes:
  performing argument extraction on the to-be-extracted event content based on the trained EAE model, to obtain a predicted probability value of at least one argument in the to-be-extracted event content;
  determining an argument with a maximum predicted probability value and an argument with a predicted probability value greater than a probability threshold in the at least one argument as the target argument;
  where the probability threshold is equal to the maximum predicted probability value multiplied by a preset coefficient, and the preset coefficient is a positive number less than or equal to 1.

In this embodiment, in the process of performing argument extraction on the to-be-extracted event content using the trained EAE model, the predicted probability value of at least one argument in the to-be-extracted event content is obtained first, then an argument with a maximum predicted probability value and an argument with a predicted probability value greater than a probability threshold in the at least one argument are determined as the target argument, to achieve argument extraction. In this way, the target argument is determined from at least one argument based on the maximum predicted probability value and the preset coefficient, thereby improving the accuracy of the target argument.

In an embodiment, the training the pre-trained model in accordance with the event news annotation data and the loss function, to obtain the trained EAE model includes: performing a format transformation on the event news annotation data in accordance with a preset question answering (QA) format, to obtain news QA data; training the pre-trained model in accordance with the news QA data and the loss function, to obtain the trained EAE model.

The preset QA format is composed of three elements, namely, descriptive sentence, question and answer to the question (i.e., argument). In other words, data in the preset QA format includes contents of the above three elements. A format transformation may be performed on the event news annotation data in accordance with the preset QA format to obtain news QA data. In other words, the event news annotation data is transformed into news QA data in the preset QA format. The news QA data includes contents of the three elements of the preset QA format. The contents of the three elements in the news QA data are obtained from the event news annotation data. The content of answer element in the news QA data is arguments annotated in the event news annotation data. The content of descriptive sentence element in the news QA data is event news in the event news annotation data. The question is constructed from the event type and each argument role of the event type in the event news annotation data, therefore, the content of question element in the news QA data is obtained based on the event type and each argument role of the event type in the event news annotation data, and specifically includes the event type and each argument role of the event type in the event news annotation data. The argument role corresponding to each event type is predetermined, and the event type of the event news annotation data may be determined in various manners, which is not limited in this embodiment. For example, the event type may be obtained via a prediction of the event news annotation data using a conventional event type categorization model.

In this embodiment, the pre-trained model is trained in accordance with the news QA data and the loss function to obtain the trained EAE model. In this way, the performance of trained EAE model can be improved, thereby improving effectiveness of argument extraction.

In an embodiment, the performing argument extraction on the to-be-extracted event content based on the trained EAE model, to obtain the target argument of the to-be-extracted event content includes: predicting an event type of the to-be-extracted event content using a trained event type categorization model; predicting an event descriptive sentence of the to-be-extracted event content using a trained event sentence discriminator model; constructing to-be-extracted question answering (QA) data corresponding to the to-be-extracted event content based on the event type, the event descriptive sentence, an argument role corresponding to the event type, and a preset QA format, where a format of the to-be-extracted QA data matches the preset QA format, and the to-be-extracted QA data includes the event descriptive sentence of the to-be-extracted event content, the event type of the to-be-extracted event content, and the argument role corresponding to the event type; and inputting the to-be-extracted QA data to the trained EAE model, and performing argument extraction using the trained EAE model, to obtain the target argument.

After the to-be-extracted event content is acquired, an event type may be predicted using a trained event type categorization model, and an event descriptive sentence of the to-be-extracted event news may be obtained using a trained event sentence discriminator model. The to-be-extracted QA data of the to-be-extracted event news is constructed from the event descriptive sentence, the event type, and an argument role corresponding to the event type of the to-be-extracted event news according to the preset QA format (as illustrated above, the preset QA format is composed of three elements, namely, descriptive sentence, question and answer to the question (i.e., argument)), where a format of the to-be-extracted QA data matches the preset QA format. Then the to-be-extracted QA data is inputted to the trained EAE model, and argument extraction is performed using the EAE model, to obtain the target argument of the to-be-extracted event content. It is noted that, in the process of performing argument extraction on the to-be-extracted event content based on the trained EAE model, to obtain a predicted probability value of at least one argument in the to-be-extracted event content, argument extraction may be performed on the to-be-extracted QA data of the to-be-extracted event content based on the trained EAE model, to obtain the predicted probability value of at least one argument in the to-be-extracted event content, that is, the to-be-extracted QA data of the to-be-extracted event content is inputted to the EAE model to perform argument probability prediction.

In this embodiment, the to-be-extracted QA data inputted to EAE model includes the event descriptive sentence of the to-be-extracted event content, the event type of the to-be-extracted event content, and the argument role corresponding to the event type; the event argument extraction is performed by inputting the to-be-extracted QA data, whose format matches the preset QA format, to the trained EAE model; and the EAE model is obtained by introducing event news samples and reading comprehension data into the training on the basis of the pre-trained model, thereby improving effectiveness of event argument extraction.

In an example, a format of to-be-extracted QA data includes two elements out of the three elements of the preset QA format, namely, descriptive sentence element and question element. In this way, it may be considered that a format of to-be-extracted QA data matches a format of reading comprehension data. The event descriptive sentence of the to-be-extracted event news corresponds to the content of the descriptive sentence element, that is, the to-be-extracted QA data includes contents of event descriptive sentence element and question element (the content of question element in the to-be-extracted QA data includes a predicted event type of the to-be-extracted event news and an argument role corresponding to the event type of the to-be-extracted event news) of the to-be-extracted event news.

The process of the foregoing EAE method is described in detail in a specific embodiment hereinafter.

Figure 2:
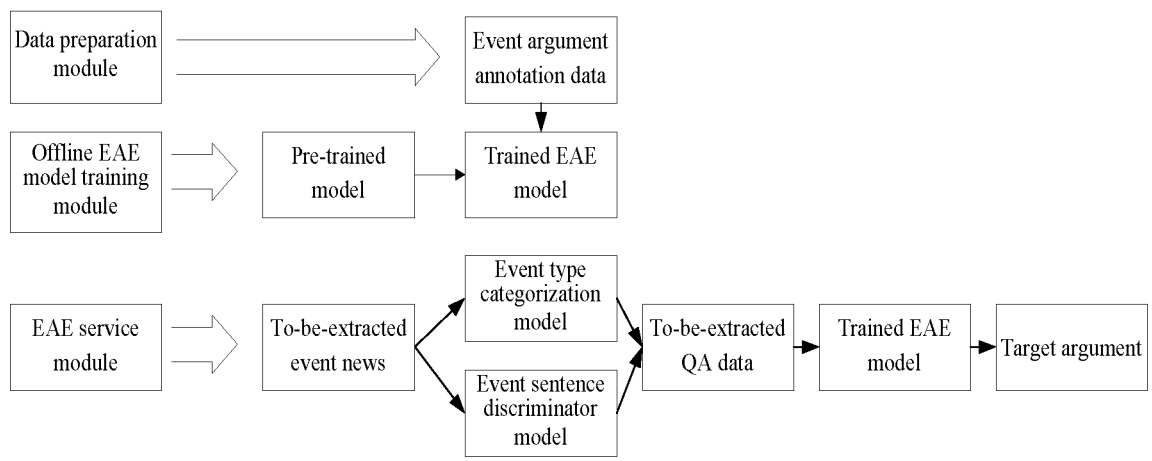
FIG. 2 is a diagram illustrating a principle of an EAE method according to an embodiment of the present application.

As shown in FIG. 2, which is a diagram illustrating a principle of a system implementing the above EAE method, the system includes a data preparation module, an offline EAE model training module and an EAE service module.

First, the data preparation module may collect the event news annotation data, and perform format transformation on the event news annotation data in accordance with a preset QA format (including three elements, namely, descriptive sentence element (which may be understood as the context element), question element and answer element), to obtain news QA data (including event news in the event news argument annotation data, question, and answer to the question that is determined based on the event news in the event news argument annotation data). The event descriptive sentence (i.e., event news of the news argument annotation data) is used as the context, that is, the event news may be understood as the event news context; the question is constructed from the event type and each argument role; and the argument corresponding to the argument role is answer, thus forming the news QA data in the QA format. For example, a context is "the movie 'The White Storm 2: Drug Lords', directed by Herman Yau and starring Andy Lau, Louis Koo, Kiu Wai Miu, is released on July 7.", the question is "released, actor", and the answer is "Andy Lau, Louis Koo, Kiu Wai Miu", where the "released" is the event type, the "actor" is an argument role of the event type, and the "Andy Lau", "Louis Koo", "Kiu Wai Miu" are multiple arguments of the argument role. Since the argument role corresponding to the event type is predetermined, after the event type is determined, corresponding argument role may be determined. It may be understood, the content of question includes both the event type and the argument role corresponding to the event type.

Moreover, in this embodiment, the question is constructed from the event type and each argument role of the event type in the event news annotation data. The argument role corresponding to each event type is predetermined, and the event type of the event news annotation data may be determined in various manners, which is not limited in this embodiment. For example, the event type may be obtained via a prediction of the event news annotation data using a conventional event type categorization model.

Further, the weight of each argument may be calculated. Normalized weights may be calculated using a conventional word importance calculation model. The weights are used in the calculation of the loss function in the model training.

Then the offline EAE model training module trains a pre-trained model. Herein a deep pre-trained model is used as an example of the pre-trained model. On the basis of the deep pre-trained model, the event news annotation data is input to the deep pre-trained model to have a fine tuning. In the process of model training, the model looks for an answer, i.e., an argument, in the event news context according to the question, in which the training is performed by fitting the loss function associated with the weight and predicted probability value of each argument annotated in the event news annotation data. By means of gradient descent and back-propagation, the model parameters are updated iteratively with the loss value, to obtain a converged training model, i.e., a trained EAE model, thereby improving the EAE capability of the model.

Next, the EAE service module acquires to-be-extracted event news (e.g., news title, and news context), i.e., the to-be-extracted event content, predicts the event type using the conventional event type categorization model (i.e., a trained event type categorization model), and acquires an event descriptive sentence of the to-be-extracted event news using the conventional event sentence discriminator model (i.e., a trained event sentence discriminator model). The EAE service module constructs, according to a reading comprehension data format, to-be-extracted QA data of the to-be-extracted event news using the event descriptive sentence, the event type and an argument role corresponding to the event type of the to-be-extracted event news, where a format of the to-be-extracted QA data matches the reading comprehension data format. It is understood, the format of to-be-extracted QA data includes two elements out of the three elements of the foregoing QA format, namely, the descriptive sentence element and the question element. In this way, it may be considered that the format of to-be-extracted QA data matches a QA format. The event descriptive sentence of the to-be-extracted event news corresponds to the content of the descriptive sentence element, that is, the to-be-extracted QA data includes contents of the event descriptive sentence element and the question element (the content of question element in the to-be-extracted QA data includes a predicted event type of the to-be-extracted event news and an argument role corresponding to the event type of the to-be-extracted event news) of the to-be-extracted event news. Then, the EAE service module inputs the to-be-extracted QA data to the trained EAE model. The EAE model generates, from the event descriptive sentence, predicted probabilities of all answers to the question in the to-be-extracted QA data. An answer with a maximum predicted probability value and an answer with a predicted probability value greater than a probability threshold among all answers are determined as the target argument of the to-be-extracted event news.

In the present application, the event argument extraction is performed by inputting to-be-extracted QA data in the QA format of the to-be-extracted event news to the trained EAE model, and by further introducing the event news annotation data and a weight of each argument annotated in the event news annotation data on the basis of the deep pre-trained model, thus improving effectiveness of event argument extraction and achieving a better extraction performance in the real-world scenario.

The EAE can find significant application in the event graph project: by means of the EAE, events are presented in a structured form, and events are presented in the context of great search and feed event, thereby helping users to understand the event quickly. Furthermore, the EAE may be applied to various fields, e.g., in financial field, the EAE may be used to extract corporate events, to enable efficient risk control, etc.

Figure 3:
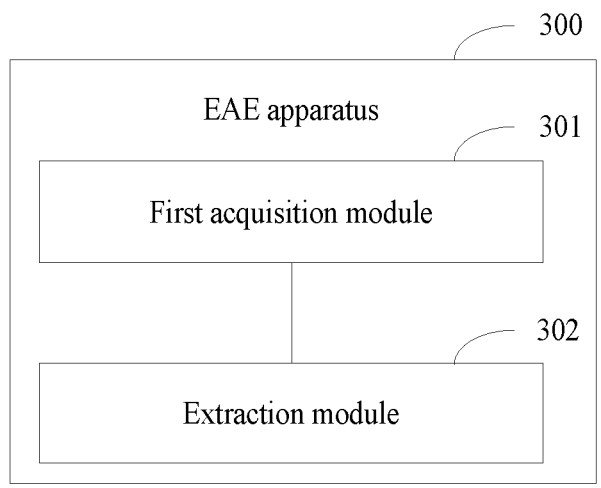
FIG. 3 is a structural diagram of an EAE apparatus according to an embodiment of the present application.

As shown in FIG. 3, the application further provides in an embodiment an EAE apparatus 300. The apparatus 300 may be applied to an electronic device and includes a first acquisition module 301 and an extraction module 302. The first acquisition module 301 is configured to acquire a to-be-extracted event content. The extraction module 302 is configured to perform argument extraction on the to-be-extracted event content based on a trained EAE model, to obtain a target argument of the to-be-extracted event content. The trained EAE model is obtained by training a pre-trained model with event news annotation data and a weight of each argument annotated in the event news annotation data.

In an embodiment, the trained EAE model is obtained by training the pre-trained model in accordance with the event news annotation data and a loss function, to obtain the trained EAE model, where the loss function is associated with a predicted probability value, predicted by the pre-trained model, of each argument annotated in the event news annotation data and the weight of each argument annotated in the event news annotation data.

In an embodiment, the loss function is a weighted sum of negative log-likelihoods of predicted probability values, predicted by the pre-trained model, of all arguments annotated in the event news annotation data.

In an embodiment, the extraction module includes:
a probability prediction module, configured to perform argument extraction on the to-be-extracted event content based on the trained EAE model, to obtain a predicted probability value of at least one argument in the to-be-extracted event content; and
an argument determination module, configured to determine an argument with a maximum predicted probability value and an argument with a predicted probability value greater than a probability threshold in the at least one argument as the target argument;

where the probability threshold is equal to the maximum predicted probability value multiplied by a preset coefficient, and the preset coefficient is a positive number less than or equal to 1.

In an embodiment, the training the pre-trained model in accordance with the event news annotation data and the loss function, to obtain the trained EAE model includes: performing a format transformation on the event news annotation data in accordance with a preset QA format, to obtain news QA data; and training the pre-trained model in accordance with the news QA data and the loss function, to obtain the trained EAE model.

In an embodiment, the extraction module includes:

a first prediction module, configured to predict an event type of the to-be-extracted event content using a trained event type categorization model;

a second prediction module, configured to predict an event descriptive sentence of the to-be-extracted event content using a trained event sentence discriminator model;

a constructing module, configured to construct to-be-extracted QA data corresponding to the to-be-extracted event content based on the event type, the event descriptive sentence, an argument role corresponding to the event type, and a preset QA format, where a format of the to-be-extracted QA data matches the preset QA format, and the to-be-extracted QA data comprises the event descriptive sentence of the to-be-extracted event content, the event type of the to-be-extracted event content, and the argument role corresponding to the event type; and an argument extraction module, configured to input the to-be-extracted QA data to the trained EAE model, and perform argument extraction using the trained EAE model, to obtain the target argument.

It is noted, the to-be-extracted QA data of the to-be-extracted event content may be inputted to the trained EAE model, and the probability prediction module may be configured to perform argument extraction on the to-be-extracted QA data of the to-be-extracted event content based on the trained EAE model, to obtain a predicted probability value of at least one argument in the to-be-extracted event content.

The EAE apparatus of the foregoing embodiments is an apparatus for implementing the EAE method of the foregoing embodiments, and has corresponding technical features and technical effects, which are not described in detailed again.

According to embodiments of the present application, an electronic device and a readable storage medium are further provided.

Figure 4:
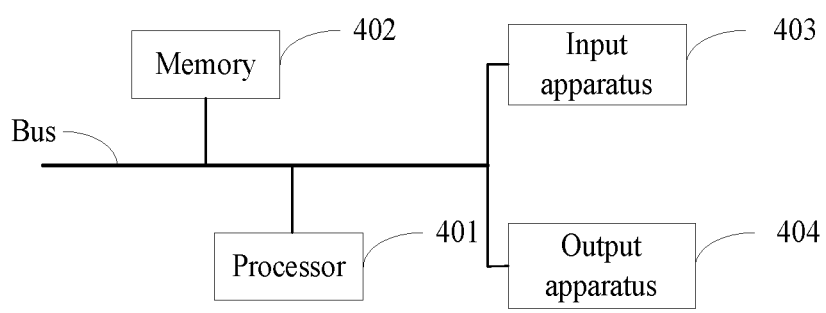
FIG. 4 is a block diagram of an electronic device configured to implement an EAE method according to embodiments of the present application.

Referring to FIG. 4, a block diagram of an electronic device configured to implement an EAE method according to embodiments of the present application is illustrated. The electronic device is intended to represent various forms of digital computers, such as laptop computer, desktop computer, workstation, personal digital assistant, server, blade server, mainframe and other suitable computers. The electronic device may represent various forms of mobile apparatus as well, such as personal digital processing device, cellular phone, smart phone, wearable device and other similar computing apparatus. The components, the connections and relationships therebetween and the functions thereof described herein are merely illustrative examples, and are not intended to limit the implementation of this application described and/or claimed herein.

As shown in FIG. 4, the electronic device includes: one or more processors 401, a memory 402, and interfaces including a high speed interface and a low speed interface, which are used for connecting various parts. The various parts are interconnected by different buses, and may be installed on a common motherboard or installed in another manner as required. The processor may process instructions configured to be executed in the electronic device, and the instructions include those stored in the memory and used for displaying graphic information of GUI on an external input/output device (e.g., a display device coupled to the interface). In other implementations, if needed, multiple processors and/or multiple buses may be used together with multiple memories. Similarly, multiple electronic devices may be connected, where each electronic device performs a part of necessary operations (e.g., serving as a server array, a group of blade servers, or a multi-processor system). FIG. 4 illustrates a single processor 401 as an example.

The memory 402 is the non-transitory computer readable storage medium according to the present application. The memory stores instructions configured to be executed by at least one processor, so that the at least one processor implements the EAE method according to the present application. The non-transitory computer readable storage medium according to the present application stores computer instructions configured to be executed by a computer to implement the EAE method according to the present application.

As a non-transitory computer readable storage medium, the memory 402 may be used to store a non-transitory software program, a non-transitory computer executable program and modules, such as the program instructions/modules corresponding to the EAE method according to some embodiments of the present application (e.g., the first acquisition module 301, the extraction module 302 as shown in FIG. 3). The processor 401 is configured to perform various functional applications of server and data processing, that is, to implement the EAE methods according to the foregoing method embodiments, by running non-transitory software program, instructions and modules stored in the memory 402.

The memory 402 may include a program storage zone and a data storage zone. The program storage zone may store an operating system, and an application program required by at least one function. The data storage zone may store data created according to the usage of the electronic device and the like. Further, the memory 402 may include a high speed random access memory, or a non-transitory memory, e.g., at least one magnetic disk storage device, a flash memory device, or other non-transitory solid-state storage device. In some embodiments, the memory 402 optionally includes a memory located remote to the processor 401. The remote memory may be connected to the electronic device via a network. For example, the network includes, but is not limited to: Internet, intranet, local area network, mobile communication network or a combination thereof.

The electronic device for implementing the EAE method may further include: an input apparatus 403 and an output apparatus 404. The processor 401, the memory 402, the input apparatus 403 and the output apparatus 404 may be connected by bus or in other manner. In FIG. 4, a connection by bus is illustrated as an example.

The input apparatus 403 can receive inputted numeric or character information, and generate key signal inputs related to the user settings and functional control of the electronic device. The input device 403 may be, for example, a touch screen, keypad, mouse, trackpad, touchpad, indication rod, one or more mouse buttons, trackball, joystick, or the like. The output apparatus 404 may include a display device, auxiliary lighting apparatus (e.g., an LED), tactile feedback device (e.g., a vibration motor) and the like. The display device may include, but is not limited to, a liquid crystal display (LCD), light-emitting diode (LED) display and plasma display. In some implementations, the display device may be a touch screen.

The various implementations of the system and technique described herein may be implemented in a digital electronic circuit system, integrated circuit system, application specific integrated circuit (ASIC), computer hardware, firmware, software and/or a combination thereof. The implementations may include: the system and technique implemented in one or more computer programs configured to be executed and/or interpreted by a programmable system of at least one programmable processor. The programmable processor may be a special purpose or general purpose programmable processor, and may receive data and instructions from a storage system, at least one input apparatus and at least one output apparatus, and transmit data and instructions to the storage system, the at least one input apparatus and the at least one output apparatus.

The computing programs (also known as program, software, software application, or code) include machine instructions for a programmable processor, and may be implemented using procedural and/or object-oriented programming languages and/or assembly/machine languages. As used herein, the terms "machine readable medium" and "computer readable medium" refer to any computer program product, device and/or apparatus (e.g., a magnetic disk, optical disk, memory, programmable logic device (PLD)) configured to provide machine instructions and/or data to a programmable processor, and include a machine readable medium receiving machine instructions in the form of machine readable signals. The term "machine readable signal" refers to any signal used to provide machine instructions and/or data to a programmable processor.

To provide for interactions with users, the system and technique described herein may be implemented in the computer. The computer is provided with a display apparatus (e.g., a cathode ray tube (CRT) or liquid crystal display (LCD) display) for displaying information to users, a keyboard and a pointing apparatus (e.g., a mouse or trackball). A user may provide input to the computer through the keyboard and the pointing apparatus. Other types of apparatus may be provided for the interactions with users, for example, the feedbacks provided to users may be any form of sensory feedbacks (e.g., visual feedback, auditory feedback, or tactile feedback); and the user input may be received in any form (including sound input, voice input or tactile input).

The system and technique described herein may be implemented in a computing system including a background component (e.g., serving as a data server), a computing system including a middleware component (e.g., an application server), a computing system including a front-end component (e.g., a user computer provided with a GUI or web browser by which users may interact with the implementation of the system and technique described herein), or a computing system including any combination of such background component, middleware component or front-end component. The components of the system may be interconnected by digital data communication in any form or medium (e.g., communication network). The communication network includes for example: local area network (LAN), wide area network (WAN) and Internet.

The computer system may include a client and a server. Generally, the client and the server are far from each other and interact with each other through a communication network. The client-server relationship is generated by computer programs running on respective computers and having a client-server relation therebetween.

According to the technical solutions of the embodiments of the present application, the trained EAE model used in the argument extraction performed on the to-be-extracted event content is obtained by training the pre-trained model with event news annotation data and a weight of each argument annotated in the event news annotation data, that is, the weight of each argument annotated in the event news annotation data used in training is considered in the training process, which can improve the performance of trained EAE model, thereby improving effectiveness of argument extraction.

It is understood, various forms of processes as shown above may be used, and steps thereof may rearranged, added or deleted. For example, as long as a desired outcome of the technical solutions disclosed in the present application is achieved, the steps set forth in the present application may be performed in parallel, sequentially, or in a different order, which is not limited herein.

The above specific implementations do not constitute a limitation to the scope of the present application. It is appreciated by those skilled in art, various modifications, combinations, sub-combinations and replacements may be made according to design requirements or other considerations. Any modification, equivalent replacement and improvement made without departing from the spirit and principle of the present application shall be deemed as falling within the scope of the present application.

What is claimed is:

1. An event argument extraction (EAE) method, comprising:
    acquiring a to-be-extracted event content; and
    performing argument extraction on the to-be-extracted event content based on a trained EAE model, to obtain a target argument of the to-be-extracted event content;
    wherein the trained EAE model is obtained by training a pre-trained model with event news annotation data and a weight of each argument annotated in the event news annotation data,
    wherein the trained EAE model is obtained at least in following manner:
    training the pre-trained model in accordance with the event news annotation data and a loss function, to obtain the trained EAE model, wherein the loss function is associated with a predicted probability value, predicted by the pre-trained model, of each argument annotated in the event news annotation data and the weight of each argument annotated in the event news annotation data,
    wherein the performing argument extraction on the to-be-extracted event content based on a trained EAE model, to obtain a target argument of the to-be-extracted event content comprises:
    predicting an event type of the to-be-extracted event content using a trained event type categorization model;
    predicting an event descriptive sentence of the to-be-extracted event content using a trained event sentence discriminator model;

constructing to-be-extracted question answering (QA) data corresponding to the to-be-extracted event content based on the event type, the event descriptive sentence, an argument role corresponding to the event type, and a preset QA format, wherein a format of the to-be-extracted QA data matches the preset QA format, and the to-be-extracted QA data comprises the event descriptive sentence of the to-be-extracted event content, the event type of the to-be-extracted event content, and the argument role corresponding to the event type; and inputting the to-be-extracted QA data to the trained EAE model, and performing argument extraction using the trained EAE model, to obtain the target argument.

2. The EAE method according to claim 1, wherein the loss function is a weighted sum of negative log-likelihoods of predicted probability values, predicted by the pre-trained model, of all arguments annotated in the event news annotation data.

3. The EAE method according to claim 1, wherein the performing argument extraction on the to-be-extracted event content based on the trained EAE model, to obtain the target argument of the to-be-extracted event content comprises:

performing argument extraction on the to-be-extracted event content based on the trained EAE model, to obtain a predicted probability value of at least one argument in the to-be-extracted event content; and determining an argument with a maximum predicted probability value and an argument with a predicted probability value greater than a probability threshold in the at least one argument as the target argument;

wherein the probability threshold is equal to the maximum predicted probability value multiplied by a preset coefficient, and the preset coefficient is a positive number less than or equal to 1.

4. The EAE method according to claim 1, wherein the training the pre-trained model in accordance with the event news annotation data and the loss function, to obtain the trained EAE model comprises:

performing a format transformation on the event news annotation data in accordance with a preset question answering (QA) format, to obtain news QA data; and training the pre-trained model in accordance with the news QA data and the loss function, to obtain the trained EAE model.

5. An electronic device, comprising:
at least one processor; and
a memory communicatively connected to the at least one processor,
wherein the memory stores therein instructions configured to be executed by the at least one processor, and the at least one processor is configured to:
acquire a to-be-extracted event content; and
perform argument extraction on the to-be-extracted event content based on a trained EAE model, to obtain a target argument of the to-be-extracted event content;
wherein the trained EAE model is obtained by training a pre-trained model with event news annotation data and a weight of each argument annotated in the event news annotation data,
wherein the trained EAE model is obtained at least in following manner:
training the pre-trained model in accordance with the event news annotation data and a loss function, to obtain the trained EAE model, wherein the loss function is associated with a predicted probability value, predicted by the pre-trained model, of each argument annotated in the event news annotation data and the weight of each argument annotated in the event news annotation data, wherein the processor is further configured to:
predict an event type of the to-be-extracted event content using a trained event type categorization model;
predict an event descriptive sentence of the to-be-extracted event content using a trained event sentence discriminator model;
construct to-be-extracted question answering (QA) data corresponding to the to-be-extracted event content based on the event type, the event descriptive sentence, an argument role corresponding to the event type, and a preset QA format, wherein a format of the to-be-extracted QA data matches the preset QA format, and the to-be-extracted QA data comprises the event descriptive sentence of the to-be-extracted event content, the event type of the to-be-extracted event content, and the argument role corresponding to the event type; and
input the to-be-extracted QA data to the trained EAE model, and perform argument extraction using the trained EAE model, to obtain the target argument.

6. The electronic device according to claim 5, wherein the loss function is a weighted sum of negative log-likelihoods of predicted probability values, predicted by the pre-trained model, of all arguments annotated in the event news annotation data.

7. The electronic device according to claim 5, wherein the processor is further configured to perform argument extraction on the to-be-extracted event content based on the trained EAE model, to obtain a predicted probability value of at least one argument in the to-be-extracted event content; and determine an argument with a maximum predicted probability value and an argument with a predicted probability value greater than a probability threshold in the at least one argument as the target argument;
wherein the probability threshold is equal to the maximum predicted probability value multiplied by a preset coefficient, and the preset coefficient is a positive number less than or equal to 1.

8. The electronic device according to claim 5, wherein the training the pre-trained model in accordance with the event news annotation data and the loss function, to obtain the trained EAE model comprises:

performing a format transformation on the event news annotation data in accordance with a preset QA format, to obtain news QA data; and training the pre-trained model in accordance with the news QA data and the loss function, to obtain the trained EAE model.

9. A non-transitory computer readable storage medium storing therein computer instructions, wherein the computer instructions are configured to cause a computer to implement the EAE method comprising:

acquiring a to-be-extracted event content; and
performing argument extraction on the to-be-extracted event content based on a trained EAE model, to obtain a target argument of the to-be-extracted event content;
wherein the trained EAE model is obtained by training a pre-trained model with event news annotation data and a weight of each argument annotated in the event news annotation data,
wherein the trained EAE model is obtained at least in following manner:

training the pre-trained model in accordance with the event news annotation data and a loss function, to obtain the trained EAE model, wherein the loss function is associated with a predicted probability value, predicted by the pre-trained model, of each argument annotated in the event news annotation data and the weight of each argument annotated in the event news annotation data, wherein the performing argument extraction on the to-be-extracted event content based on a trained EAE model, to obtain a target argument of the to-be-extracted event content comprises:

predicting an event type of the to-be-extracted event content using a trained event type categorization model;

predicting an event descriptive sentence of the to-be-extracted event content using a trained event sentence discriminator model;

constructing to-be-extracted question answering (QA) data corresponding to the to-be-extracted event content based on the event type, the event descriptive sentence, an argument role corresponding to the event type, and a preset QA format, wherein a format of the to-be-extracted QA data matches the preset QA format, and the to-be-extracted QA data comprises the event descriptive sentence of the to-be-extracted event content, the event type of the to-be-extracted event content, and the argument role corresponding to the event type; and inputting the to-be-extracted QA data to the trained EAE model, and performing argument extraction using the trained EAE model, to obtain the target argument.

* * * * *